Dec. 3, 1963   F. H. BAL   3,112,910
MULTI-PURPOSE TELESCOPIC SUPPORT
Filed July 25, 1961
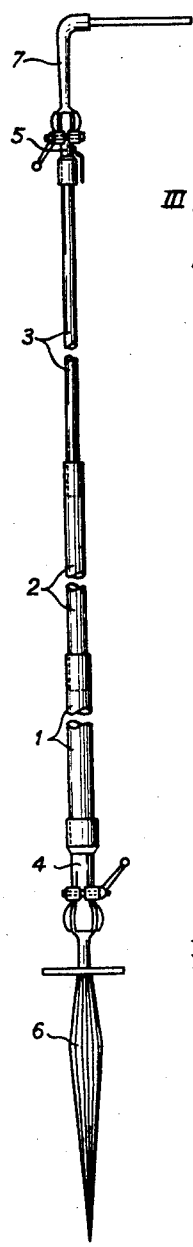
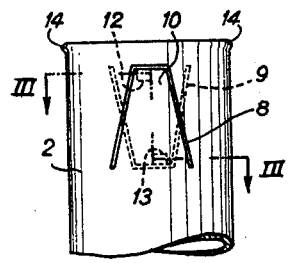
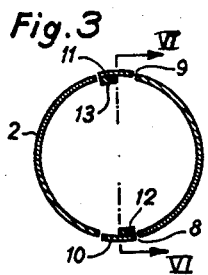
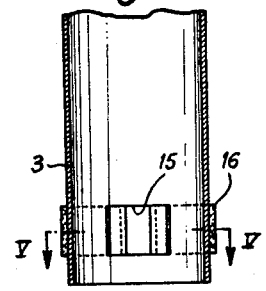
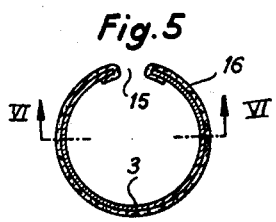
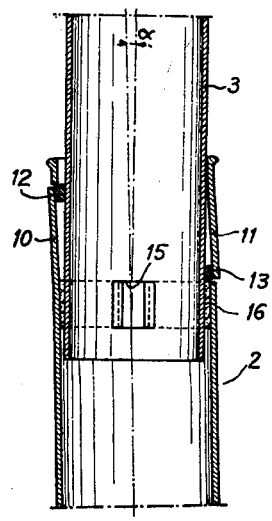
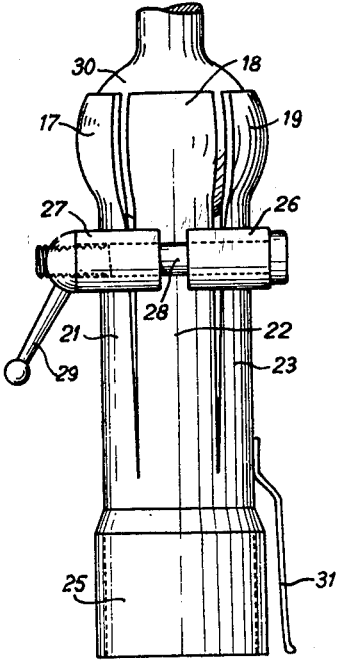
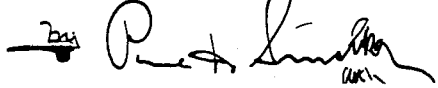

United States Patent Office 3,112,910
Patented Dec. 3, 1963

3,112,910
MULTI-PURPOSE TELESCOPIC SUPPORT
François Hubert Bal, 25 Rue Thibaud-Chabran,
Cormeilles-en-Parisis, France
Filed July 25, 1961, Ser. No. 126,540
Claims priority, application France July 28, 1960
4 Claims. (Cl. 248—161)

The invention has for its object an easy-to-carry, multi-purpose telescopic support capable of being fixed in different places by suitable means and of receiving a variety of appliances through the medium of further appropriate means.

Such a support is particularly suited to sports and open-air activity, in which it enables a wide variety of objects or a clean surface such as a mobile rest to be kept within easy reach of the user, or a contraption such as a fishing-rod to be held in position. Such a support is also usable for professional activities and in particular for those of a roaming nature, such as activity on building sites; it is also useful in certain manual trades. In such applications, the transportable telescopic support enables tools or other objects required by the workmen to be kept within easy reach at their work stations.

A telescopic support according to the invention comprises at least two tubes sliding into each other, and receives at each end either a member that is invariably attached to some object, or a member capable of gripping a ball fixed to some object. Each of said tubes constituting the telescopic support has an outer diameter which is slightly less than the inner diameter of the tube into which it fits and carries at its bottom a flexible ring into which an indentation is cut parallel to its axis. Inside the top of the corresponding female tube two diametrically-opposed protrusions are secured resiliently and offset longitudinally.

The member intended to be fixed to the support and adapted to grip a ball consists essentially of four spherical sections arranged in the form of petals and fixed to four stems mounted on a common articulation, said stems being placed between a split ring which can be clamped tight by a quick-tightening device.

The description which follows with reference to the accompanying drawing, given by way of example and not of limitation, will give a clear understanding of how the invention may be performed, any particularities emerging from the drawing or the specification naturally falling within the scope of the invention.

In the drawing:

FIG. 1 is an overall elevational view of the telescopic support according to the invention.

FIG. 2 is a larger-scale elevation view of the top of an intermediate or bottom tube.

FIG. 3 is a section along the line III—III in FIG. 2.

FIG. 4 is an elevation view of the lower end of an intermediate or top tube.

FIG. 5 is a section along the line V—V in FIG. 4.

FIG. 6 is a fragmental longitudinal section view of two tubes fitting into each other, the female tube being viewed along the line VI—VI in FIG. 3 and the male tube along the line VI—VI in FIG. 5.

FIG. 7 is an elevation view of a ball-jointed fixing member.

The telescopic support according to the invention, which may be made of any suitable material, comprises a number of telescoping tubes such as 1, 2 and 3, the bottom tube 1 being adapted to receive a fixing member 4 and the top tube 3 a fixing member 5. The bottom fixing member 4 is adapted to receive an anchoring device 6 such as a spike and the top fixing member 5 some supported object 7 such as a rest.

The bottom tube 1 and the intermediate tubes such as the tube 2 are provided at their upper ends with two diametrically-opposed truncated-V slits 8 and 9 which are inverted relative to each other, the narrow part of the slit 8 being turned upwardly and the narrow part of the slit 9 downwardly. These slits 8 and 9 outline elastic tongues 10 and 11 similar to clarinet reeds. To said tongues 10 and 11 are welded or otherwise fixed tongues 12 and 13 respectively. It is to be noted that these tongues or protrusions 12 and 13 are offset longitudinally in relation to each other. Intermediate tubes such as the tube 2 are provided with a reinforcement consisting of a bead 14 running round their upper edge, but the top tube 3 has neither bead, slits nor protrusions at its upper end.

The top tube 3 and the intermediate tubes such as 2 are provided with a rectangular aperture 15 at their lower end. A felt strip 16 is glued round the outside of the tube and forms a ring having a gap located opposite the aperture 15. No difficulty whatever will be experienced in fixing the end of the felt strip 16 in position after the latter has first been coated with glue on one face, the procedure being similar to that used for inserting the end of a photographic film into the slit in a camera spool. The felt strip 16 is then wound round said tube and its other end engaged in the aperture 15, thereby obtaining the arrangement shown in FIG. 5. If necessary, the felt strip 16 can be retained against the lip of the aperture 15 by means of clips until the glue sets.

Each tube 3 or 2 has an outer diameter slightly less than the inner diameter of the corresponding female tube 2 or 1, while the felt ring 16 has an outer diameter substantially equal to the inner diameter of the corresponding female tube. The height of the aperture 15 and of the ring 16 is less than the longitudinal distance between the protrusions 12 and 13, while the width of said protrusions 12 and 13 is less than the width of the aperture 15 minus twice the felt thickness. The degree to which the protrusions 12 and 13 stand proud of the inner surface of the tube 2 is such that they are caused to spread slightly by virtue of the resiliency of the tongues 10 and 11 to allow the male tube to pass through. It will be appreciated therefore that to introduce a tube into the corresponding female tube it is first necessary to place the aperture 15 opposite the protrusion 12, push the male tube in until the ring 16 clears the protrusion 12, rotate it through 180° to bring the aperture 15 opposite the protrusion 13, and push it in again so that the ring 16 clears the protrusion 13. To disengage the tubes, the order of operations is reversed. The protrusions 12 and 13 and the aperture 15 may be chambered at their tops and bottoms to facilitate relative movement.

It may be seen that assembly and disassembly of the tubes is particularly easy. Indeed this is an important feature of the invention, as outdoor utilization of the telescopic support will call for frequent dismantling for cleaning purposes.

FIG. 6 shows a pair of associated tubes in the extended position, that is to say in the normal utilization position. The felt ring 16 abuts against the protrusion 13 and it may be seen that the combined effect of the protrusions 12 and 13 and the elasticity of the tongues 10 and 11 results in the axis of the male tube being inclined at an angle α relative to that of the female tube. In the utilization position, the telescopic support will therefore be slightly cambered, which may present a number of advantages.

Friction of the felt ring 16 inside the female tube and abutment against the male tube of the protrusions 12 and 13 through the medium of the tongues 10 and 11 will generally suffice to prevent said male tube from telescoping downwardly into the female tube under the forces normally applied to the telescopic support. It is however possible to enhance the pressure exerted by the tongues 10 and 11 by means of an elastic ring such as a metal split ring (not shown) surrounding the female tube.

The ball-jointed fixing member shown in FIG. 7 comprises four spherical sections 17, 18, 19 and 20 arranged in the form cupped petals and extended by four stems 21, 22, 23 and 24 resiliently and integrally united to a socket 25. In the arrangement shown in FIG. 7, the stems are shown to be sliced out of a cylindrical member. Two ring halves 26 and 27 having a threaded pinch-bolt 28 passing through them surround the four stems 21, 22, 23 and 24. Said pinch-bolt 28 comprises a head and its thread is coarse-pitched; it cooperates with a lever-nut 29. It will be seen that tightening of the nut 29 brings the two ring halves 26 and 27 together, thereby causing tightening. This constricting effect brings the stem 21 and its petal 17 nearer to the stem 23 and its petal 19; similarly, it brings the stem 22 and its petal 18 nearer to the stem 24 and its petal 20 (not shown). The ball 30 supporting the appliance (not shown) is thus gripped firmly and clamped between the four petals 17, 18, 19 and 20. The ball 30 may be fluted if desired. The clip 31 serves to carry the device and is designed to be hooked onto a belt.

The socket 25 is designed to be an exact fit on one of the ends of the telescopic support. Two fixing members such as that shown in FIG. 7 will generally be provided, of which one will have a socket 25 with an inner diameter equal to the outer diameter of the bottom tube 1, the other a socket 25 with an inner diameter equal to the outer diameter of the top tube 3.

A wide variety of anchoring devices may be provided, adapted to be fitted with one or more balls such as 30 for joining to one or more telescopic supports. The anchoring device shown in FIG. 1 is in the form of a sharp-pointed spike 6 designed to be driven into the ground. Obviously, a same anchoring device may comprise a plurality of associated spikes.

A further anchoring device consists of caliper-shaped tongs hinged about a point integral with a ball such as 30, the arms of the tongs being linked by a coarse-pitch threaded rod having a head and cooperating with a lever-nut similar to the nut 29 of FIG. 7. The arcuate tong arms bulge out and have pointed ends. This anchoring device is designed to be fixed onto a piece of wood, but its ends may also be adapted to receive rubber suction caps so that the device may be fixed to some hard surface.

In another anchoring device derived from the former, the threaded rod and the clamping nut are replaced by a ring which surrounds the two tong arms and engages into racks carried thereon.

Yet another anchoring device, which is likewise capable of receiving one or more balls such as 30, has a concave top designed to serve as a rest. The bottom of the support may be fitted with a suction cap.

The wide variety of appliances capable of being supported on the telescopic support according to the invention includes an articulated V comprising two branches hinged about a point integral with a ball such as 30. Said two branches have heels which in the unfolded position are in contact with each other to enable the branches to be spread as required. Said two branches may be covered with plastic.

Manifestly, it is possible without departing from the scope of the invention to substitute equivalent mechanical means for those described hereinabove. By way of example, the tubes may be fitted into one another in the opposite direction, and the tongues may be cut into the male tube and the felt ring glued inside the female tube; similarly, instead of being made of felt, said ring may be made of leather, rubber, plastic or any other suitable flexible material; in addition, instead of being orientable, the members adapted to the support may be of the fixed type, and instead of being associated to sockets and slipped over the bottom and top tubes, these members may carry rods which fit into said tubes.

What is claimed is:

1. In a telescopic support having anchoring means and coupling means holding objects to be supported, the improvement comprising in combination a plurality of tubes telescoping with radial play, adjacent tubes having cooperating female and male ends; two substantially diametrally opposed and resiliently mounted protrusions within the female end of each tube, said protrusions being of the same width and offset against each other by a predetermined distance in axial direction of the tube; a strip made of deformable material outwardly attached to the male end of each tube, said strip having a thickness fitting the radial play of the tubes and forming an open ring including a longitudinal gap shorter in length than the said predetermined distance between said protrusions but wider than the width of the protrusions.

2. A telescopic support according to claim 1 comprising two substantially U-shaped tongues adapted to resiliently support on their free ends one protrusion each, said tongues being stamped out of the female end of the tubes in substantially diametrally opposed and axially reversed relation, one tongue being directed outwardly from the tube and the other tongue inwardly into the tube.

3. A telescopic support according to claim 1 comprising an elongated opening in the male end of the tube said opening coinciding with the said gap of said ring-shaped strip and adapted to receive folded ends of the strip to form said open ring and to guide one protrusion.

4. In combination with the telescopic support according to claim 1, holding means for the object to be supported comprising a tubular member, longitudinal slits extending in the end portion thereof to form intermediate stems; a spherically bent outer portion in each stem; a ball joint member adapted to be attached to the object to be supported and to be received by said spherically bent outer portions of the stems; and clamping means embracing said stems below their said outer portions and adapted to press these portions against said ball joint member.

References Cited in the file of this patent

UNITED STATES PATENTS

| | | |
|---|---|---|
| 769,447 | McKinney | Sept. 6, 1904 |
| 1,107,075 | Karges | Aug. 11, 1914 |
| 1,946,644 | Spica | Feb. 13, 1934 |
| 1,999,844 | McElroy | Apr. 30, 1935 |
| 2,703,691 | Minnis | Mar. 8, 1955 |

FOREIGN PATENTS

| | | |
|---|---|---|
| 343,465 | Great Britain | Feb. 18, 1931 |
| 478,075 | France | Aug. 30, 1915 |